United States Patent [19]
Walker

[11] 3,714,571
[45] Jan. 30, 1973

[54] APPARATUS AND METHOD FOR TESTING ELECTRICAL SYSTEMS HAVING PULSE SIGNAL RESPONSES

[75] Inventor: Jerome F. Walker, Shaker Heights, Ohio

[73] Assignee: Digital General Corporation, Cleveland, Ohio

[22] Filed: March 4, 1970

[21] Appl. No.: 16,459

[52] U.S. Cl. ................. 324/133, 324/51, 340/146.2
[51] Int. Cl. ....................... G01r 19/16, G01r 31/02
[58] Field of Search ....... 324/73, 133, 51; 340/248 A, 340/248 B, 248 P, 146.2, 149

[56] References Cited

UNITED STATES PATENTS

| | | | |
|---|---|---|---|
| 3,248,721 | 4/1966 | Cockrell et al. | 324/73 X |
| 3,286,175 | 11/1966 | Gerbier et al. | 324/23 |
| 3,122,729 | 2/1964 | Bothwell et al. | 340/248 |
| 2,973,508 | 2/1961 | Chadurjian | 324/73 UX |
| 2,985,298 | 5/1961 | Schreiner | 340/248 P UX |
| 3,500,369 | 3/1970 | Kellam | 340/248 |
| 3,239,735 | 3/1966 | Raider et al. | 340/146.2 X |
| 3,302,109 | 1/1967 | Jones | 340/146.2 X |
| 3,621,387 | 11/1971 | Smith et al. | 324/73 R |

OTHER PUBLICATIONS

Cargile; Wm. P.; A Computer-Controlled System for Testing Digital Logic Modules, Hewlett Packard Journal, Mar. 1969, pp. 14–20

Locke; P. E.; Digital Comparison, IBM Technical Disclosure Bulletin, Vol. 4, No. 3, Aug. 1961, pp 34, 35.

*Primary Examiner*—Gerard R. Strecker
*Attorney*—Yount and Tarolli

[57] ABSTRACT

Apparatus and method are provided for diagnostically testing electrical systems, such as printed circuit boards and integrated circuits. In testing an electrical system having an output terminal which would normally or abnormally provide a pulse signal in response to a test signal applied to an input terminal thereof, a test signal is applied to the input terminal and a signal comparison is made to verify whether any response occuring at the output terminal corresponds with a signal representative of the anticipated pulse signal response.

2 Claims, 4 Drawing Figures

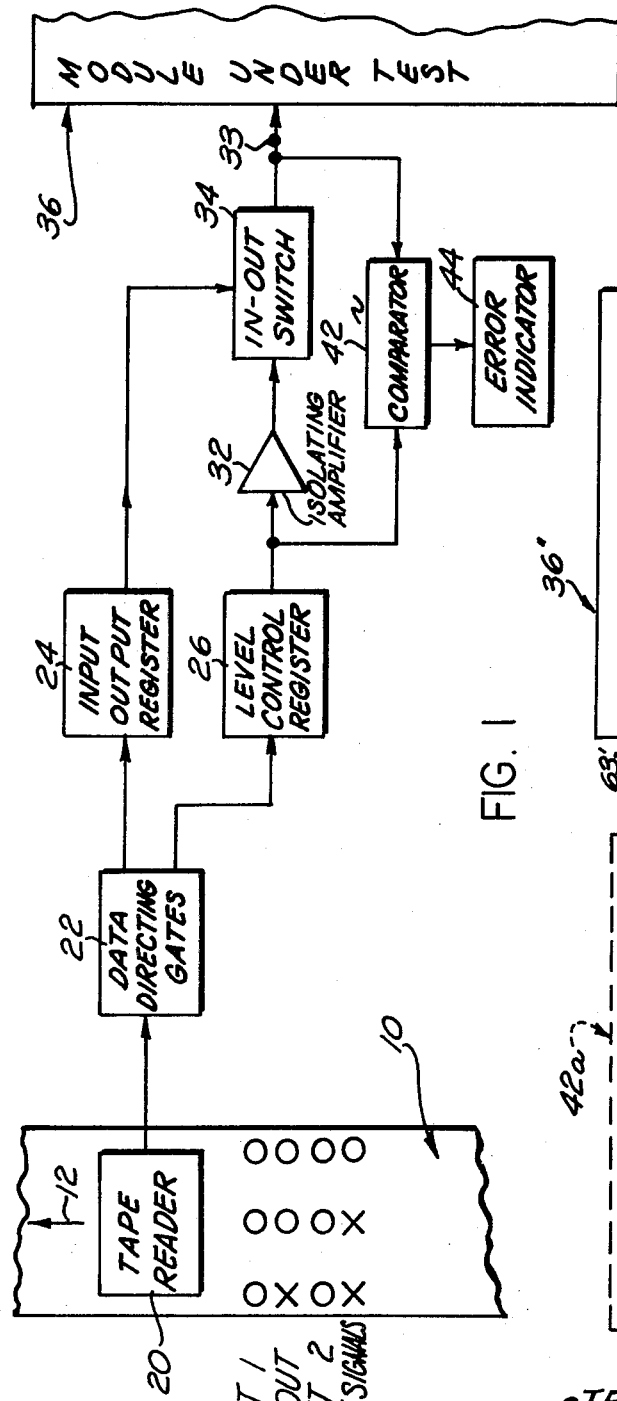
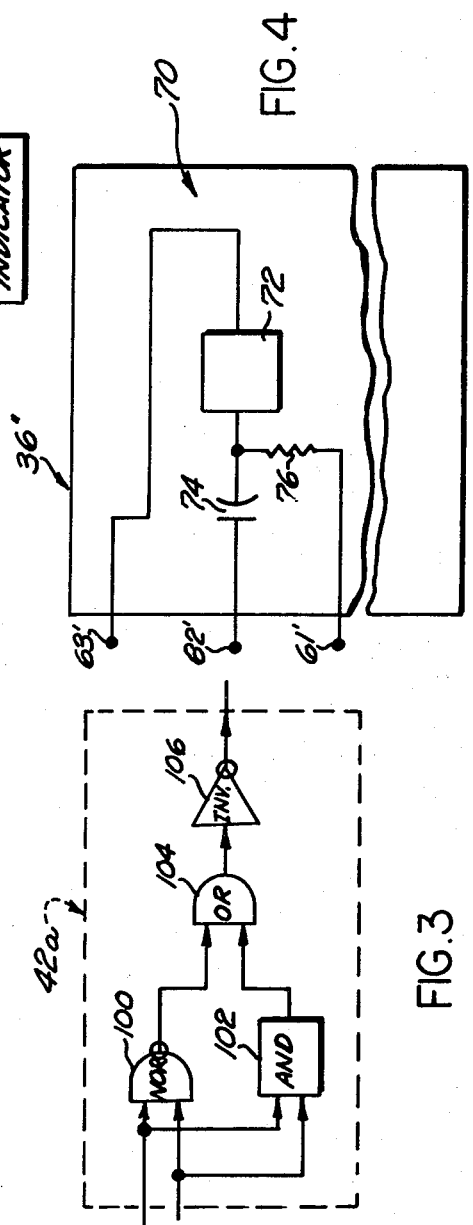
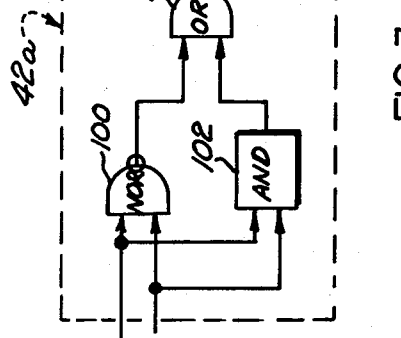
FIG. 1
FIG. 4
FIG. 3
INVENTOR
JEROME F. WALKER
BY Yount and Tarolli
ATTORNEYS

APPARATUS AND METHOD FOR TESTING ELECTRICAL SYSTEMS HAVING PULSE SIGNAL RESPONSES

This invention relates to the art of testing and, more particularly, to diagnostic testing of electrical systems.

The invention is particularly applicable for use in diagnostically testing printed circuit boards and integrated circuits; although it will be appreciated that the invention has broader applications and may be used, for example, in diagnostically testing various other types of electrical circuits.

In the production of electrical systems, such as printed circuit boards and integrated circuits, various complex manufacturing steps are involved. As the number of manufacturing steps and production volume increases quality control measures are frequently invoked. In addition to quality control of production steps and techniques, many manufacturers of electrical systems find it desirable to electrically test either randomly selected production units of all production units to determine whether the units operate as designed.

Many electronic circuits used in digital or numerical control equipment generate or are operated by signal pulses. To adequately test such a system, it is desirable to obtain verification as to whether any output pulse signal response obtained in response to a test input signal corresponds with the anticipated or unwanted pulse signal response.

The present invention relates to apparatus and method for testing electrical systems to satisfy the foregoing objectives.

In accordance with the present invention, apparatus and method are provided for testing an electrical system having an output terminal for providing a pulse signal in response to a test signal being applied to an input terminal thereof. A test signal is applied to an input terminal of such a system, a binary signal is provided which is representative of the anticipated pulse signal response at the output terminal of the system, and a signal comparison is made to verify whether any response at the output terminal corresponds with the anticipated pulse signal response.

The primary object of the present invention is to provide apparatus and method for testing electrical systems having a plurality of terminals in an efficient and economical manner.

Another object of the present invention is to provide apparatus and method for testing electrical systems having pulse responses to input signals and wherein a signal comparison is made to verify whether the level of any output signal present at the output terminal of such a system corresponds with a test signal representative of the anticipated pulse response.

These and other objects and advantages of the invention will become apparent from the following description of the preferred embodiment of the invention as read in connection with the accompanying drawings, in which:

FIG. 1 is a block diagram illustration of the preferred embodiment of the invention;

FIG. 3 is a combined schematic block diagram illustration of a binary comparator circuit which may be used in the embodiment of the invention shown in FIG. 1; and FIG. 4 is an illustration of an illustrative electrical system having a plurality of terminals and which is particularly applicable for being tested in accordance with the present invention.

Figure 2:
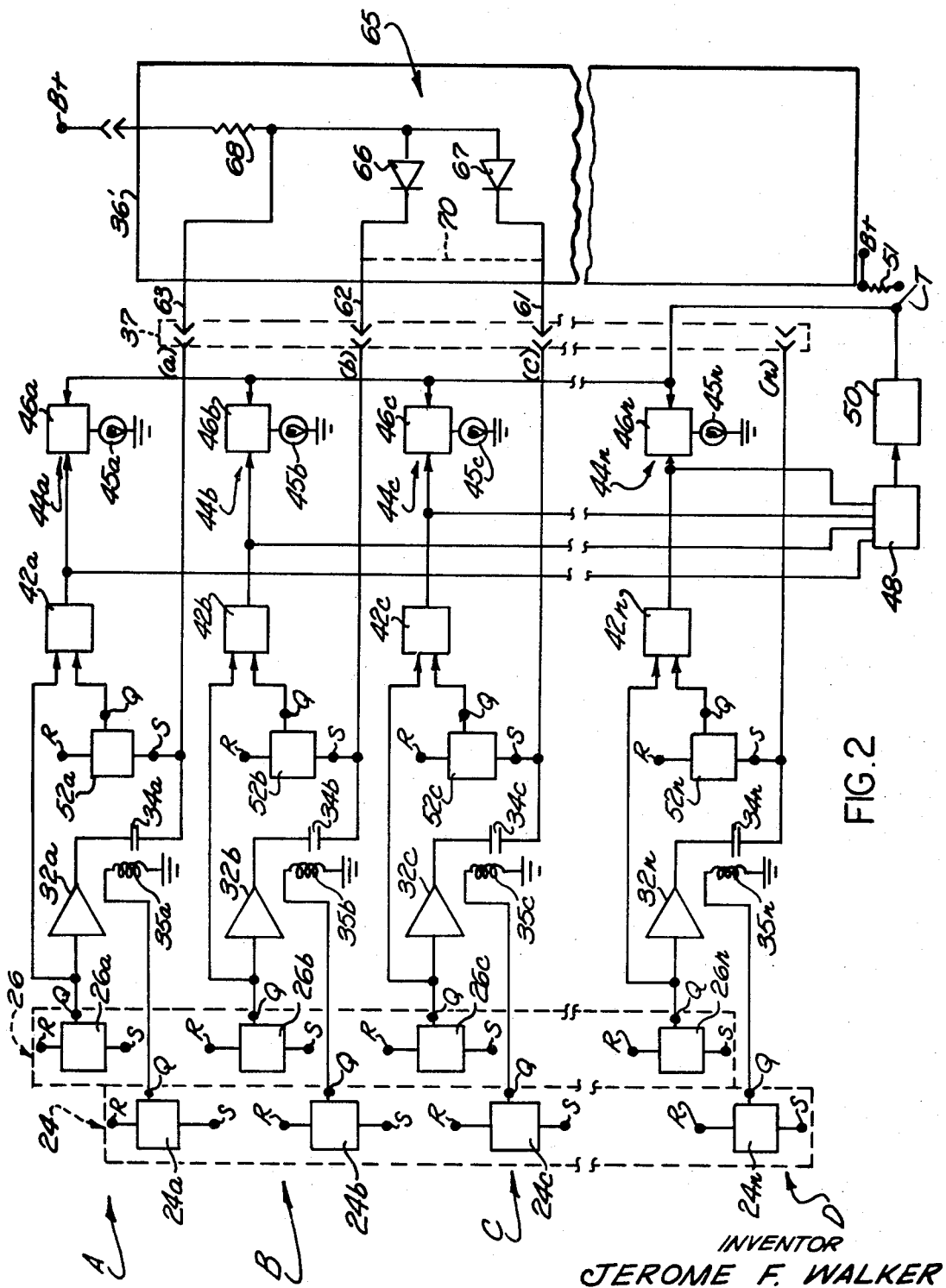
FIG. 2 is a combined schematic block diagram illustration of the circuitry employed in the embodiment of the invention shown in FIG. 1.

Referring now to the drawings, wherein the showings are for purposes of illustrating a preferred embodiment of the invention only and not for purposes of limiting same, FIG. 1 illustrates a tape reader 20 for translating binary information stored in a programmed perforated paper tape 10; data directional gates 22 for receiving the binary information obtained from tape reader 20 and directing the information to an input-output register 24 and a level control register 26. The output of the level control register 26 is applied through a signal isolating amplifier 32 to an input-output switch 34 which is controlled by the input-output register 24. The output of the input-output switch 34 is applied to a terminal 33 of an electrical system, or module, 36 under test. The input-output switch 34, under control of the input-output register 24, renders terminal 33 as either an input terminal of module 36 for receiving a test signal from register 26 through amplifier 32 and input-output switch 34, or renders the terminal 33 as the output terminal of module 36. Whether or not terminal 33 serves as an input terminal for receiving signals from register 26, or an output terminal for carrying any output signal from module 36, any signal actually present on terminal 33 is applied to one input of a comparator 42 for comparison with the test signal obtained from the output circuit of register 26. If the two signals do not correspond, then comparator 42 actuates an error indicator 44. Having briefly described the general operation of the invention, reference is now made to the following description of FIGS. 2 through 4 for a more detailed description of the invention.

Reference is now made to FIG. 2, wherein there is illustrated an electrical system, or module, 36' having terminals 61, 62 and 63 to be tested in accordance with the present invention. For purposes of illustration, module 36' is shown as including an AND gate 65. This AND gate includes a pair of diodes 66, 67 having their anodes connected together in common and thence through a resistor 68 to a B+ voltage supply source. The cathodes of diodes 66 and 67 are respectively coupled to terminals 62 and 61. The common connected anodes of diodes 66 and 67 are also connected to terminal 63.

The diagnostic computer shown in FIG. 2 has a plurality of testing circuits A, B and C through N which are respectively used for testing an electrical system. As shown in FIG. 2, testing circuits A, B and C are respectively used in conjunction with terminals 63, 62 and 61 of module 36'. The output circuits a, b, c of testing circuits A, B, C are coupled to terminals 63, 62 and 61, respectively, by means of a suitable electrical coupling 37.

The input-output register 24 includes a plurality of memory circuits which preferably take the form of transistorized flip-flops 24a, 24b and 24c through 24n respectively included within the testing circuits A, B and C through N. Similarly, level control register 24 includes a plurality of memory elements in the form of transistorized flip-flops 26a 26b and 26c through 26n respectively included within testing circuits A, B and C through N. These flip-flops may take any of the known forms of bistable memory elements and, hence, may be magnetic cores or ferroelectric capacitors. As shown, they include conventional transistorized flip-flop circuits each having a reset terminal R, a set terminal S and an output terminal q. Typically, in such a circuit, upon receipt of a reset signal at terminal R a binary 0 or ground level signal appears at the output terminal Q. Thereafter, upon receipt of a binary 1 or positive signal at the set terminal S a binary 1 signal is present on the output terminal q.

Each of the testing circuits A, B and C through N are identical and, hence, only circuit A will be described in detail herein with like components in the remaining testing circuits being identified with like character references followed by the designation $a, b, c$ or $n$. Testing circuit A includes flip-flop 24a of the input-output register 24 having its output terminal q coupled to ground through an operating coil 35a of a relay having normally open contacts 34a. Preferably, input-output switch 34 takes the form of encapsulated reed relay contacts 34a through 34n which are operated by operating coils, such as coil 35a, under the control of the associated input-output register flip-flops. Circuit A also includes a flip-flop 26a of the level control register 26 having its output terminal Q coupled to the input of a signal isolating amplifier 32a. The output of amplifier 32a is coupled through relay contacts 34a and test output circuit a to terminal 63 of module 36'. Output terminal Q of flip-flop 26a is also coupled to one input of a binary comparator 42a. The output of comparator 42a is connected to the input of a light driver 46a, which may take the form, for example, of a simple transistor switch. The output circuit of light driver 46a is coupled to a lamp 45a. The combination of light driver 46a and lamp 45a define the error indicator 44a which has a corresponding equivalent in circuits B and C through N. A second input to the binary comparator 42a is taken from output terminal Q of flip-flop 52a constructed in the same fashion as flip-flops 24a and 26a. The set terminal S of flip-flop 52a is coupled directly to terminal 63 of module 36' through test output circuit a. The outputs of each binary comparator circuit 42a through 42n are coupled to an OR gate 48 and thence to a common alarm indicator 50. Alarm indicator 50, may in the manner of individual error indicators 44a through 44n, include a light driver together with an indicator lamp or buzzer. For purposes of testing the common alarm 50 and the individual error indicators 44a through 44n a test switch T is provided having inputs coupled to the common alarm 50 as well as to each of the light drivers 46a through 46n. Switch T, as shown in FIG. 2, is normally in an open condition, and when closed serves to apply a B+ test signal through a resistor 51 to the inputs of each of the error indicators 44a through 44n as well as the common alarm 50.

Reference is now made to FIG. 3 which illustrates one example of circuitry that may be employed for each binary comparator 42a through 42n. As shown in FIG. 3, with reference to binary comparator 42, there is provided a TTL NOR gate 100, as well as an AND gate 102, each having two inputs respectively taken from output terminal Q of flip-flop 26a and output terminal Q of flip-flop 52a. The output terminals of gates 100 and 102 are coupled to the input side of an OR gate 104 which has its output coupled through a signal inverter amplifier 106 which, in turn, has its output coupled to the input of light driver 46a as well as to the OR gate 48. The circuit shown in FIG. 3 will serve the function of providing a binary 0 signal at its output terminal so long as both input terminals receive binary signals of the same level; to wit, both input of gates 100 and 102 receive either binary 0 signals or binary 1 signals. In the event, however, one input receives a binary 0 signal and the other input receives a binary 1 signal then the output of inverter amplifier 106 will be a binary 1 signal for actuating both error indicator 44a as well as common alarm 50.

OPERATION

For purposes of illustration, the diagnostic computer will now be described in conjunction with testing an AND circuit 65 illustrated in FIG. 2 which has input terminals 61 and 62 and an output terminal 63. It is contemplated that the AND circuit be tested by placing various combinations of binary 1 and binary 0 signals on terminals 61 and 62 and then observing output terminal 63 for a proper response. At least four tests should be considered for this AND gate; namely, 1. applying binary 1 signals to each of the terminals 61 and 62 and then checking terminal 63 for a positive or binary 1 signal;
2. applying a binary 1 signal to terminal 61, a binary 0 signal to terminal 62 and checking for a binary 0 signal at terminal 63;
3. applying a binary 0 signal to terminal 61, a binary 1 signal to terminal 62 and checking for a binary 0 signal at terminal 63; and,
4. applying binary 0 signals to terminals 61 and 62, and checking for a binary 0 signal at terminal 63.

The foregoing tests would normally be considered different to fully check AND circuit 65 for proper operation. However, if a circuit malfunction, such as a short circuit 70 shown by dotted lines in FIG. 2, exists within module 36' between terminals 61 and 62, then at least tests (2) and (3) above will not function properly since the actual signal levels at both input terminals will be at ground level or binary 0 signals. Similarly, test (1) will not function properly if either terminal 61 or 62 is shorted to ground within module 36'. Also, test (4) will not function properly if, for example, an open circuit exists between the anodes of diodes 66 and 67 and the junction of terminal 63 and resistor 68. Consequently, in testing AND circuit 65 for proper operation, it is desirable that verification be made as to whether any response existing at terminal 63 corresponds with the anticipated response, and whether the signals actually present at terminals 61 and 62 correspond with the test signals which presumably have been applied to these terminals.

Referring to FIG. 2, each of the input-output register flip-flops 26a through 26n may be programmed to provide a binary 1 or binary 0 signal at its output terminal Q. For example, with respect to test circuit A, the binary level of the output signal appearing at output terminal Q of flip-flop 26a may be considered as a test signal for comparison with the actual signal existing on terminal 63 by means of binary comparator 42a. If the output signal of flip-flop 26a is also to be applied as an input signal to terminal 63, then input-output switch 34a must be closed. This function is obtained by programming flip-flop 24a so that when it carries a binary 1 signal at its output terminal Q relay coil 35a is energized to close relay contacts 34a. Although flip-flops 24a and 26a may be manually controlled, as by push-buttons directly connected to the reset terminals R and set terminals S, they are preferably controlled by obtaining information stored in a programmed memory, such as perforated paper tape 10. In programming the diagnostic computer the first step may be to apply a reset signal to each reset terminal R of each flip-flop within registers 24 and 26. This may be accomplished in several ways. One example may be utilizing a three channel, perforated tape, such as tape 10, driven passed tape reader 20 in the direction shown by arrow 12. For purposes of illustration, tap 10 is shown as having four operational steps; to wit, reset 1, in-out, reset 2 and test signals. For example, in the first step, reset 1, each channel is provided with a perforation shown as a O on tape 10 of FIG. 1. Each perforation, in accordance with standard programming techniques, is representative of a binary 1 signal. As tape 10 is driven in the direction of the arrow 12 and read by the tape reader 20, these three binary signals are applied through data directing gates 22 to the reset terminals of flip-flops 24a, 24b and 24c in the input-output register 24. This results in a binary 0 signal being present at the output terminal Q of each of these three flip-flops.

In testing AND gate 65, terminal 63 should serve as an output terminal, and terminals 62 and 61 should serve as input terminals. Consequently, in the second operational step programmed by tape 10, the three channels are provided with the code XOO respectively representative of a binary signal 0, a binary signal 1, and a binary signal 1. This information is read by the tape reader 20 and the binary 0 signal is applied to set terminal S of flip-flop 24a and binary 1 signals are applied to set terminals S of flip-flops 24b and 24c. Since the output terminal Q of flip-flop 24a will now carry a binary 0 signal, operating coil 35a will not be energized and, hence, relay contacts 34a will remain open so that terminal 63 serves as an output terminal. The output terminals Q of flip-flops 24b and 24c carry binary 1 signals and, consequently, relay contacts 34b and 34c will be closed so that terminals 62 and 61 respectively serve as input terminals to AND gate 65. The third step in the sequence may be considered as reset 2, wherein tape 10 is programmed with three apertures, OOO, representative of three binary 1 signals. Once this information is read by tape reader 20, binary 1 signals are applied to reset terminals R of each flip-flop 26a, 26b and 26c so that the output terminals Q of these three flip-flops carry binary 0 signals. The fourth step in this sequence of operation may be considered as the test signal operation. This operation is shown in FIG. 1 as a program wherein binary 0 signals are to be applied to set terminals S of flip-flops 26a and 26b and a binary 1 signal is to be applied to set terminal S of flip-flop 26c. This will be recognized as corresponding with test (2) discussed hereinbefore.

In accordance with test (2) a binary 1 signal is applied from the output terminal Q of flip-flop 26c through isolating signal amplifier 32c, and the now closed relay contacts 34c to input terminal 61 of AND gate 65. Similarly, a binary 0 signal is applied from the output terminal Q of flip-flop 26b through isolating signal amplifier 32b, now closed relay contacts 34b to the input terminal 62 of AND gate 65. The proper response to these input signals should be a binary 0 signal at output terminal 63 of the AND gate. Since terminal 63 is connected to the set terminal S of flip-flop 52a, the output terminal Q of this flip-flop will now carry a binary 0 signal. The test signal taken from the output terminal Q of flip-flop 26a is a binary 0 signal. Thus, both inputs to binary comparator 42a are binary 0 signals and, hence, a correct response has been obtained. If, for some reason, the binary level of any signal actually present at output terminal 63 is a binary 1 signal, then flip-flop 52a would have a binary 1 signal at its output terminal Q. Binary comparator 42a would then provide a binary 1 signal at its output terminal for application to the light driver 46a and, hence, energize indicator lamp 45a. At the same time, the output circuit of binary comparator 42a would also provide a binary 1 signal through OR gate 48 to energize the common alarm 50.

If, during the foregoing testing operation, a short circuit 70 is present within module 36', then the binary 1 signal obtained from flip-flop 26c would be degraded at terminal 61 to a ground potential, or binary 0 signal. This binary 0 signal is coupled to the set input S of flip-flop 52c so that the output terminal Q of this flip-flop now carries a binary 0 signal. However, the test signal obtained from output terminal Q of level control register flip-flop 26c is a binary 1 signal and, hence, binary comparator 42c will provide a binary 1 signal at its output terminal for energizing error indicator 44c as well as common alarm 50. By the foregoing operation, each circuit B and C serves to verify whether the intended input signal corresponds with the level of the signal actually present on the input terminals of module 36', and, in addition, circuit B verifies whether or not any output signal obtained at output terminal 63 corresponds with the anticipated output signal.

PULSE RESPONSE VERIFICATION

In the description of operation thus far circuits A, B and C of FIG. 2 have been described in conjunction with operation obtained with steady state signals being applied to terminals 61 and 62, or obtained from terminal 63 of module 36'. In these steady state operations, flip-flops 52a, 52b and 52c may be dispensed with. They are, however, in accordance with the present invention, included within the circuitry for purposes of pulse response verification. For example, FIG. 4 illustrates an electrical system, or module 36'', which while having terminals 61', 62' and 63' corresponding with terminals 61, 62 and 63 of module 36', includes a substantially different electrical circuit 70. Circuit 70 is provided as an example of an electrical system which has an output terminal 63' for providing a pulse signal in response to a test signal applied to an input terminal 62'. This circuit may take various forms, such as, for example, a monostable oscillator 72 having its input connected through a capacitor 74 to terminal 62' as well as through a resistor 76 to terminal 61'. The output circuit of oscillator 72 is coupled to output terminal 63'. As is well known, a monostable oscillator, such as oscillator 72, will, upon receipt of an input signal, provide at its output terminal a pulse response of a given polarity and magnitude for a specific period of time. For purposes of testing circuit 70, output circuits a, b and c of test circuits A, B and C of the circuitry shown in FIG. 2 may be respectively connected, as by an electrical coupling 37, to terminals 63', 62' and 61'. In programming the diagnostic computer for testing circuit 70, circuits A, B and C may be operated so that terminal 61' receives a binary 0 or ground signal, terminal 62' serves as an input terminal, and terminal 63' serves as an output terminal. With all of the flip-flops being reset, then flip-flop 26b may be actuated to provide a test input signal, such as a binary 1 signal. This will be applied through coupling capacitor 74 to actuate the oscillator 72 so that, if the oscillator circuit operates properly, an output signal such as a positive polarity signal of a given magnitude and duration will appear at output terminal 63'. For purposes of verifying whether the correct output signal is obtained at terminal 63', flip-flop 26a should be programmed so that its output terminal Q carries a binary 1 signal. If, as is anticipated, output terminal 63' provides a momentary pulse response to the input signal applied to terminal 62', and if the pulse response is a positive or binary 1 signal pulse flip-flop 52a will provide a binary 1 signal at its output terminal Q. Binary signal comparator 42a serves to verify that the pulse signal response at terminal 63' is of the same binary level as the binary signal provided at the output terminal Q of slip-flop 26a. If, as anticipated, both signals are binary 1 signals, then no error indication is made. If, on the other hand, no signal response is noted at output terminal 63, or if the signal response is a negative pulse signal, then the output terminal Q of flip-flop 52a will carry a binary 0 signal, whereupon the binary signal comparator 42a will energize error indicator 44a as well as the common alarm 50.

Although the invention has been shown and described in connection with preferred method steps and apparatus, it will be readily apparent to those skilled in the art that various changes in method steps and inform and arrangement of parts may be made to suit requirements without departing from the spirit and scope of the invention as defined by the appended claims.

I claim:

1. Apparatus for testing an electrical system having an output terminal for providing a momentary pulse signal in response to a test signal applied to an input terminal thereof wherein the time duration of said pulse signal is independent of the time duration of said test signal and comprising:

means for applying a said test signal to the input terminal of said electrical system;

binary signal means separate from said test signal applying means for providing a steady state binary signal of a binary level representative of the binary level of the anticipated pulse signal response at the output terminal of a said system to the application of a said test signal to the input terminal thereof;

bistable means having an input circuit for receiving any said actual pulse signal response from said output terminal and an output circuit for providing a steady state response binary signal when said actual signal response is a pulse signal with the pulse being of a given polarity; and output pulse verification means for verifying whether any actual pulse signal response at said output terminal corresponds in binary level with the binary level of the anticipated pulse signal response, wherein said output pulse verification means includes binary signal comparator means for providing an output error signal when the binary levels of said response binary signal and said representative binary signal do not correspond.

2. A method for testing an electrical system having at least one output terminal for providing a momentary pulse signal in response to an input signal applied to an input terminal thereof wherein the time duration of said pulse signal is independent of the time duration of said input signal and comprising the steps of:

utilizing signal generating means for providing a said input signal;

applying said input signal to the input terminal of a said electrical system;

utilizing a binary signal generating means separate from said input signal generating means for providing a steady state reference binary signal having a binary level representative of the binary level of the anticipated pulse signal response at the output terminal of said system to the application of a said input signal to the input terminal of said electrical system;

developing a steady state response binary signal of the same binary level as said reference binary signal in response to a momentary pulse signal of a given polarity appearing at said output terminal; and electrically verifying that said response binary signal and test binary signal are each of the same binary level.

* * * * *